(12) United States Patent
Yamagishi

(10) Patent No.: US 11,553,107 B2
(45) Date of Patent: Jan. 10, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Daigo Yamagishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 319 days.

(21) Appl. No.: 16/352,857

(22) Filed: Mar. 14, 2019

(65) Prior Publication Data

US 2019/0312992 A1 Oct. 10, 2019

(30) Foreign Application Priority Data

Apr. 9, 2018 (JP) .............................. JP2018-075043

(51) Int. Cl.
*H04N 1/333* (2006.01)
*H04N 1/00* (2006.01)
*G06F 3/12* (2006.01)

(52) U.S. Cl.
CPC ....... *H04N 1/33361* (2013.01); *G06F 3/1207* (2013.01); *G06F 3/1259* (2013.01); *H04N 1/0009* (2013.01); *G06F 3/12* (2013.01)

(58) Field of Classification Search
CPC .............. H04N 1/33361; H04N 1/0009; G06F 3/1207; G06F 3/1259
USPC ....................................................... 358/1.15
See application file for complete search history.

(56) References Cited

U.S. PATENT DOCUMENTS

| | | | | |
|---|---|---|---|---|
| 5,396,537 A | * | 3/1995 | Schwendeman | H04M 11/022 340/7.23 |
| 9,417,826 B2 | * | 8/2016 | Ochi | G06F 3/1204 |
| 2004/0128196 A1 | * | 7/2004 | Shibuno | G06Q 30/0242 705/14.41 |
| 2011/0006909 A1 | * | 1/2011 | Rekimoto | H04W 4/029 340/8.1 |
| 2014/0036311 A1 | * | 2/2014 | Sato | G06F 3/1211 358/1.15 |
| 2016/0165089 A1 | * | 6/2016 | Goto | H04N 1/10 358/1.16 |
| 2016/0243838 A1 | * | 8/2016 | Kato | B41J 29/02 |

FOREIGN PATENT DOCUMENTS

JP    2015133528    7/2015

OTHER PUBLICATIONS

Office Action of Japan Counterpart Application, with English translation thereof, dated Nov. 30, 2021, pp. 1-5.

* cited by examiner

*Primary Examiner* — Darryl V Dottin
(74) *Attorney, Agent, or Firm* — JCIPRNET

(57) ABSTRACT

An information processing apparatus includes an acquiring unit that acquires first information satisfying a predetermined condition from first history information which is generated in an electronic device, a storage unit that stores the first information acquired by the acquiring unit in a storage device, and a control unit that performs a control of transmitting second information to an external apparatus, the second information being acquired by combining the first information stored in the storage device by the storage unit with second history information which is generated by execution of a function.

19 Claims, 7 Drawing Sheets

FIG. 5

| TIME | CONTENT |
|---|---|
| 20180303112841 | PRINTING |
| 20180303113406 | FACSIMILE TRANSMISSION PERFORMED (TRANSMISSION DESTINATION: XX-YYYY-ZZZZ) |
| ⋮ | ⋮ |

| TIME | CONTENT |
|---|---|
| 20180303111815 | BROWSING (www.123.co.jp) |
| 20180303113551 | CALL (TRANSMISSION DESTINATION: XX-YYYY-VVVV) |
| 20180303114932 | MAIL TRANSMISSION (xxx@yyy.ne.jp) |
| ⋮ | ⋮ |

24

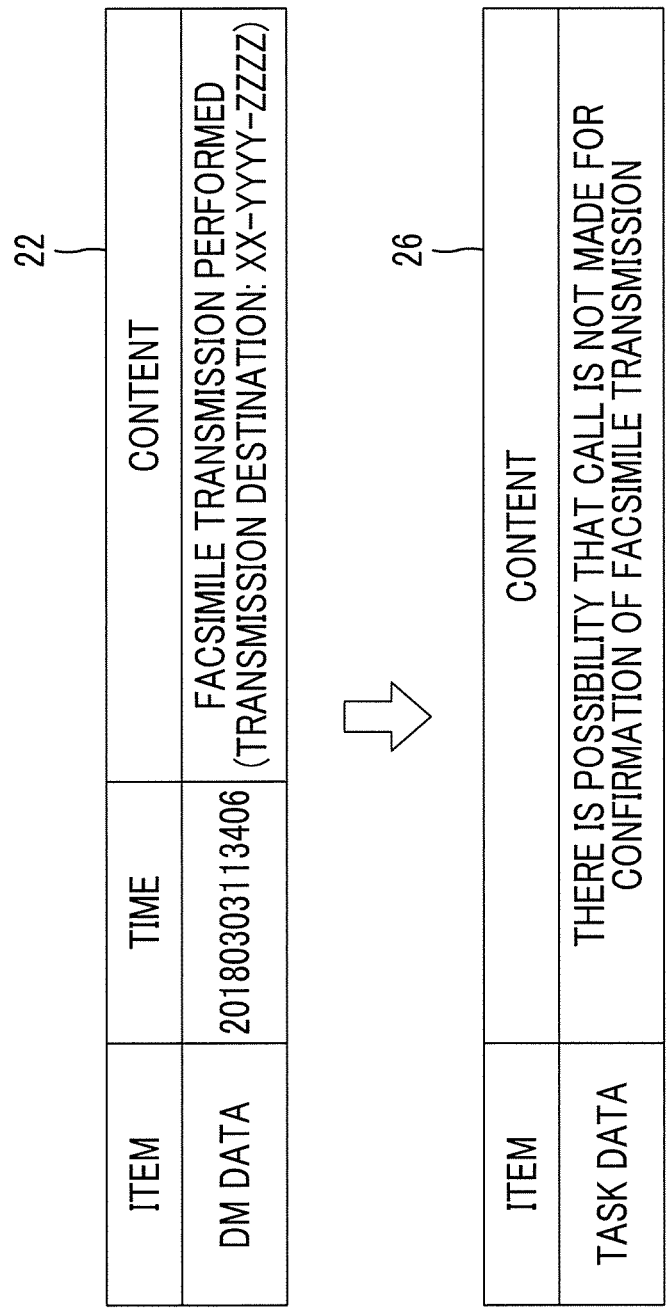

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-075043 filed Apr. 9, 2018.

BACKGROUND

(i) Technical Field

The present invention relates to an information processing apparatus and a non-transitory computer readable medium storing an information processing program.

(ii) Related Art

JP2015-133528A discloses a communication device that includes a communication unit and a control unit. The communication unit communicates with an external storage device. The control unit executes an acquiring process in which data is acquired, a replacement data transmission process in which replacement data that is data replacing original data which is the data acquired in the acquiring process is transmitted to the external storage device through the communication unit, a determination process in which a determination as to whether or not the replacement data is present in the external storage device is performed, and an original data transmission process in which the original data that corresponds to the replacement data which is determined to be not present is transmitted to the external storage device through the communication unit in a case where it is determined in the determination process that the replacement data is not present in the external storage device.

SUMMARY

In recent years, an electronic device that is connected to a communication line and transmits various kinds of information is widely used. Such an electronic device is called an "Internet of Things (IoT) device". For example, information transmitted from the IoT device is used as data that is used for analyzing a behavior pattern or the content of a task of a person.

In order to hierarchically manage IoT devices, for example, there is an information processing apparatus that is correlated with multiple IoT devices. The information processing apparatus temporarily stores information transmitted from each IoT device in a memory, and transmits information related to the IoT device requested by an analysis server to an analysis server 30.

However, in this case, in order to handle the request from the analysis server, information related to each IoT device needs to be stored in the information processing apparatus. Thus, the remaining capacity of the memory in the information processing apparatus tends to be decreased as the number of IoT devices is increased.

As the remaining capacity of the memory is decreased, for example, a situation in which a storage area needed for a process is not secured is likely to occur. Thus, swaps and the like may frequently occur in the memory.

Therefore, in a case where the information processing apparatus has a function other than transmitting information related to the IoT device to the analysis server, a decrease in the remaining capacity of the memory may cause an effect such as a delay in the function.

Aspects of non-limiting embodiments of the present disclosure relate to an information processing apparatus and a non-transitory computer readable medium storing an information processing program that enable efficient use of a storage device in which acquired information is stored, compared to a case of storing information acquired from an electronic device in the storage device without selecting the information.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including an acquiring unit that acquires first information satisfying a predetermined condition from first history information which is generated in an electronic device, a storage unit that stores the first information acquired by the acquiring unit in a storage device, and a control unit that performs a control of transmitting second information to an external apparatus, the second information being acquired by combining the first information stored in the storage device by the storage unit with second history information which is generated by execution of a function.

BRIEF DESCRIPTION OF THE DRAWINGS

Exemplary embodiment(s) of the present invention will be described in detail based on the following figures, wherein:

FIG. 5 is a diagram illustrating one example of DM data;

FIG. 6 is a diagram illustrating one example of IoT history data;

FIG. 8 is a diagram illustrating another example of the task data.

DETAILED DESCRIPTION

Hereinafter, the present exemplary embodiment will be described with reference to the drawings. Constituents and processes having the same functions will be designated by the same reference signs throughout all drawings, and descriptions of such constituents and processes will not be repeated.

Figure 1:
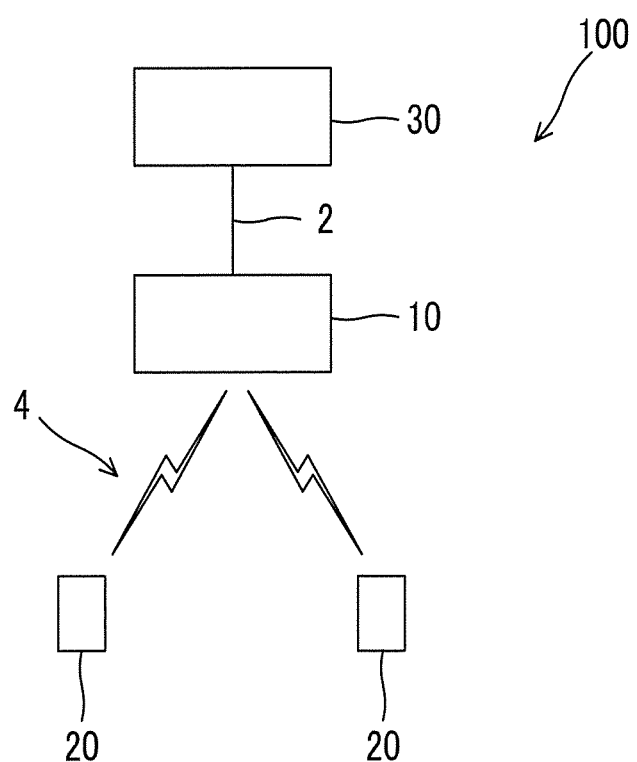
FIG. 1 is a diagram illustrating a configuration example of an information processing system.

FIG. 1 is a configuration diagram illustrating one example of an information processing system 100 according to the present exemplary embodiment. As illustrated in FIG. 1, the information processing system 100 includes an information processing apparatus 10, an IoT device 20, and an analysis server 30. The information processing apparatus 10 and the IoT device 20 are connected to each other through a communication line 4. The information processing apparatus 10 and the analysis server 30 are connected to each other through a communication line 2.

The information processing apparatus 10 broadly has two functions. One is a function that the information processing apparatus 10 originally has, and is a reason for installing the information processing apparatus 10. Another is a task data generating function of generating task data 26 by combining history information recorded by execution of the original function with history information received from the IoT device 20, and transmitting the generated task data 26 to the analysis server 30. The task data 26 indicates a task-related behavior of a user who executes the original function of the information processing apparatus 10 in a task flow using the information processing apparatus 10.

The original function of the information processing apparatus 10 may be any function and is not limited to a specific function. Hereinafter, the original function of the information processing apparatus 10 will be referred to as a "main function".

The IoT device 20 is one example of an electronic device that is used by the user in the task flow. The "electronic device" refers to a general device that operates by receiving a supply of electricity.

The IoT device 20 may be any kind of electronic device, provided that the IoT device 20 has a communication function of communicating with the information processing apparatus 10 through the communication line 4, a history function of recording an execution history of the function of the IoT device 20 and history information that is an operation history of the IoT device 20.

Specifically, the IoT device 20 may be a computer such as a tablet terminal, a smartphone, and a wearable terminal, or may be an electronic device, such as an electric light switch, an air conditioning device, and a shredder having the communication function and the history function, that is not assumed to be connected to the communication line 4 in the related art.

A structure, furniture, and the like, such as a window lock and a desk drawer, that are not electronic devices but are connected to the communication line 4 by retrofitting an IoT unit having the communication function and the history function are included in the IoT device 20 in the present exemplary embodiment.

Hereinafter, the history information that is generated in the IoT device 20 by the use of the IoT device 20 will be referred to as "IoT history data 24". The IoT history data 24 is one example of first history information according to the present exemplary embodiment.

The IoT device 20 is often installed at a location where wiring may not be easy. Thus, while the communication line 4 that connects the information processing apparatus 10 to the IoT device 20 may be a wired line, for example, the communication line 4 is preferably a wireless line.

The analysis server 30 is one example of an external apparatus that receives the task data 26 from the information processing apparatus 10 and analyzes, for example, a tendency of task-related behavior and a task-related object of the user using the information processing apparatus 10 from the received task data 26. An analysis method for the task data 26 used in the analysis server 30 is not restricted. The analysis server 30 analyzes the task data 26 using a well-known analysis method such as artificial intelligence that uses deep learning.

The communication line 2 that connects the information processing apparatus 10 to the analysis server 30 may be either a wired line or a wireless line, and may be either a dedicated line or a public line that is shared among an unspecified large number of apparatuses.

Figure 2:
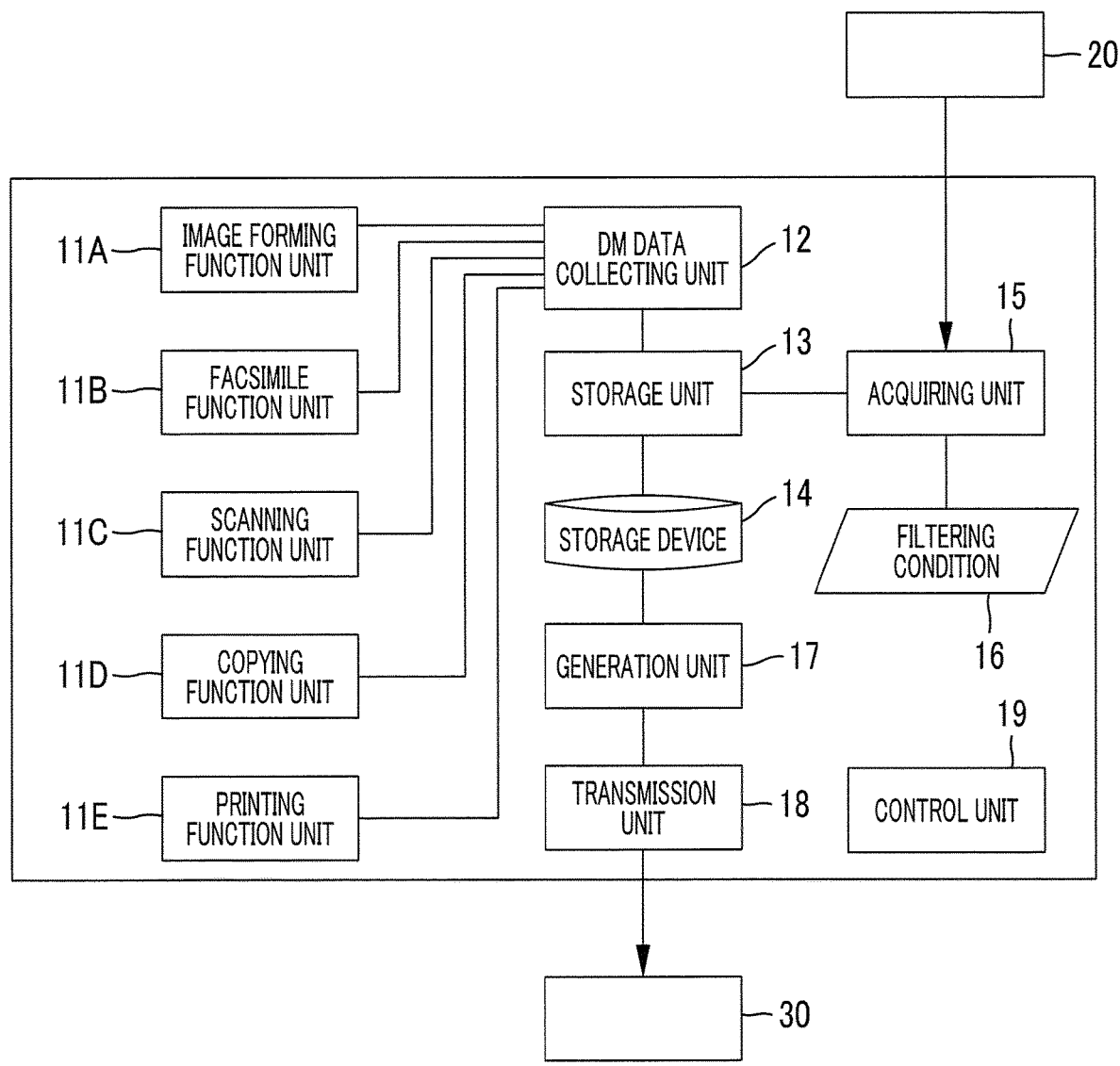
FIG. 2 is a diagram illustrating a functional configuration example in an information processing apparatus.

FIG. 2 is a diagram illustrating a functional configuration example in the information processing apparatus 10. As illustrated in FIG. 2, the information processing apparatus 10 includes an image forming function unit 11A, a facsimile function unit 11B, a scanning function unit 11C, a copying function unit 11D, and a printing function unit 11E that execute main functions in the information processing apparatus 10. In addition, the information processing apparatus 10 includes a DM data collecting unit 12, a storage unit 13, a storage device 14, an acquiring unit 15, a filtering condition 16, a generation unit 17, a transmission unit 18, and a control unit 19.

The image forming function unit 11A is a function unit that executes an image forming function of forming the content of specified document data on a recording medium such as paper.

The facsimile function unit 11B is a function unit that executes a facsimile function of transmitting and receiving document data through a facsimile line.

The scanning function unit 11C is a function unit that executes a scanning function of optically reading a content written on an original document and converting the content into document data.

The copying function unit 11D is a function unit that executes a copying function of forming the document data of the original document read in the scanning function unit 11C as an image on a recording medium, and creating a duplicate of the read original document.

The printing function unit 11E is a function unit that executes a printing function of forming document data received through the communication lines 2 and 4 as an image on a recording medium based on an instruction from the image forming function unit 11A.

The DM data collecting unit 12 collects the history information that is generated by executing each of the image forming function unit 11A, the facsimile function unit 11B, the scanning function unit 11C, the copying function unit 11D, and the printing function unit 11E.

The information processing apparatus 10 illustrated in FIG. 2 is an apparatus that has functions of performing document-related processes such as converting an original document into electronic data, transmitting and receiving the original document that is converted into the electronic data, and forming the electronic data as an image on a recording medium. Therefore, hereinafter, the history information that includes at least one of the content of an executed function or the content of an operation performed by the user by executing the function will be referred to as "document management (DM) data". The DM data collecting unit 12 notifies the storage unit 13 of the collected DM data 22 of each function unit.

The acquiring unit 15 acquires the IoT history data 24 that satisfies the filtering condition 16 among the IoT history data 24 received from the IoT device 20. The IoT history data 24 that is selected using the filtering condition 16 among the IoT history data 24 is particularly referred to as "IoT selection data 28".

The filtering condition 16 is a condition for acquiring the IoT history data 24 that is estimated to be closely correlated with the content of the task which uses the main functions focused as an analysis target of the task in the information processing apparatus 10, that is, the IoT selection data 28, from the IoT history data 24. The meaning of the "IoT history data 24 is closely correlated with the content of the task which uses the main functions" is that the IoT history data 24 is at least one of the IoT history data 24 that is generated in a case where the user uses the IoT device 20 by executing the main functions of the information processing apparatus 10, or the IoT history data 24 that is generated in a case where the user uses the IoT device 20 in advance in order to execute the main functions of the information processing apparatus 10.

That is, the IoT selection data 28 is the IoT history data 24 of the IoT device 20 that is operated by the user executing the main functions of the information processing apparatus 10.

The acquiring unit 15 notifies the storage unit 13 of the acquired IoT selection data 28.

The storage unit 13 stores the DM data 22 received from the DM data collecting unit 12 and the IoT selection data 28 received from the acquiring unit 15 in the storage device 14. In the example in FIG. 2, while the storage unit 13 stores the DM data 22 and the IoT selection data 28 in the storage device 14 that is incorporated in the information processing apparatus 10, the DM data 22 and the IoT selection data 28 do not need to be stored in the storage device 14 incorporated in the information processing apparatus 10 and may be stored in, for example, a cloud server, not illustrated, that is connected to the communication line 2. For example, the storage unit 13 may store the DM data 22 and the IoT selection data 28 in the storage device 14 of a data server, not illustrated, that is connected to the communication line 2. The "storage device 14 incorporated in the information processing apparatus 10" includes not only the storage device 14 included inside the casing of the information processing apparatus 10 but also, for example, a memory card that is inserted into a card reader included in the information processing apparatus 10, and an external storage device that is connected to the information processing apparatus 10 through a USB cable and the like.

The generation unit 17 acquires the DM data 22 of a specific main function focused as an analysis target in the information processing apparatus 10 and the IoT selection data 28 from the storage device 14, and generates the task data 26 that indicates a task-related behavior of the user for the analysis target. A specific example of the task data 26 will be described below. The generation unit 17 notifies the transmission unit 18 of the generated task data 26.

The transmission unit 18 transmits the received task data 26 to the analysis server 30 in a case where the transmission unit 18 receives the task data 26 from the generation unit 17.

The control unit 19 controls the function of each unit included in the information processing apparatus 10.

Figure 3:
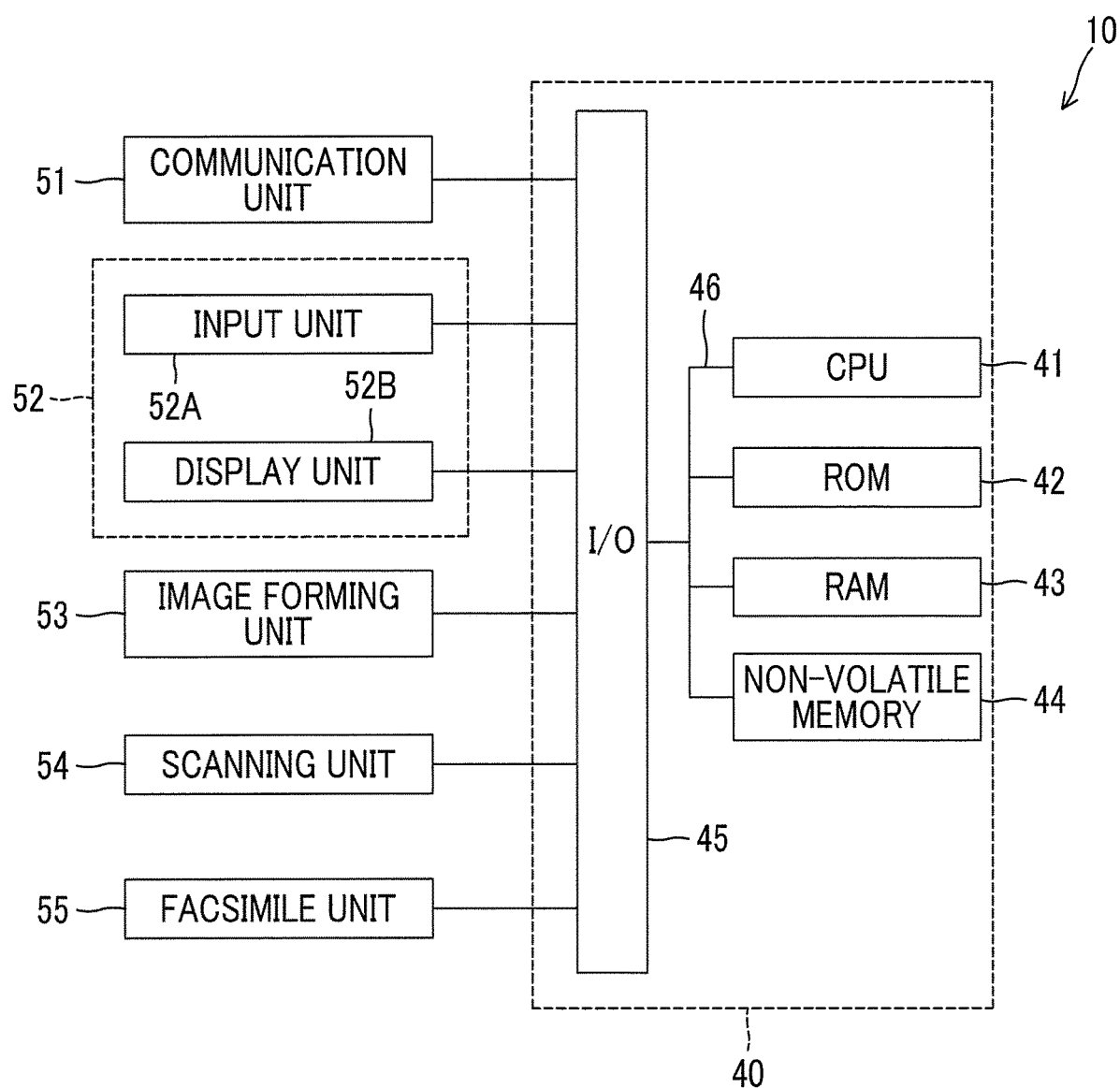
FIG. 3 is a diagram illustrating a main configuration example of an electrical system in the information processing apparatus.

FIG. 3 is a diagram illustrating a main configuration example of an electrical system in the information processing apparatus 10. The information processing apparatus 10 is configured using, for example, a computer 40.

The computer 40 includes a central processing unit (CPU) 41, a read only memory (ROM) 42, a random access memory (RAM) 43, a non-volatile memory 44, and an input-output interface (I/O) 45 for each unit of the information processing apparatus 10 according to the present exemplary embodiment illustrated in FIG. 2. The CPU 41, the ROM 42, the RAM 43, the non-volatile memory 44, and the I/O 45 are connected to each other through a bus 46.

The non-volatile memory 44 is one example of the storage device 14 that maintains stored information even in a case where electric power supplied to the non-volatile memory 44 is shut off. For example, while a semiconductor memory is used as the non-volatile memory 44, a hard disk may also be used.

For example, a communication unit 51, an operating unit 52, an image forming unit 53, a scanning unit 54, and a facsimile unit 55 are connected to the I/O 45.

The communication unit 51 connects the communication line 2 to the communication line 4 and includes a transfer protocol for transmitting and receiving data with each of the analysis server 30 and the IoT device 20.

The operating unit 52 is a unit that provides an interface for the information processing apparatus 10 to the user, and includes an input unit 52A and a display unit 52B.

The input unit 52A is an input device that receives an instruction from the user and notifies the CPU 41 of the instruction. For example, a button and a touch panel are used as the input unit 52A. The CPU 41 executes a function for which the instruction is provided from the user.

The display unit 52B is a display device that displays information processed by the CPU 41 as an image. For example, a liquid crystal display or an organic electro luminescence (EL) display is used as the display unit 52B.

The image forming unit 53 is a device that forms a received image on a recording medium such as paper in accordance with an instruction from the CPU 41. An image forming system in the image forming unit 53 may be any system such as an electrophotographic system or an inkjet system. The image forming unit 53 is used by executing the image forming function, the copying function, the facsimile function, and the printing function.

The scanning unit 54 is a device that optically reads the content of an original document which is set on, for example, a platen glass, not illustrated, and converts the content of the original document into image data in accordance with an instruction from the CPU 41. The scanning unit 54 is used by executing the scanning function.

The facsimile unit 55 is a device that transmits and receives the image data of the original document with another device having the facsimile function through the facsimile line not illustrated. In addition, the CPU 41 forms the image data received from the facsimile line as an image on a recording medium in the image forming unit 53, or stores the image data in the storage device 14.

The copying function is implemented by the CPU 41 forming the image data acquired in the scanning unit 54 on a recording medium in the image forming unit 53.

A unit connected to the I/O 45 is not limited to each unit illustrated in FIG. 3. For example, a voice recognition unit that recognizes a voice of the user may be connected to the I/O 45. In this case, the CPU 41 may execute a function for which an instruction is provided by the voice of the user.

Next, the operation of the information processing system 100 will be described with reference to FIG. 4.

Figure 4:
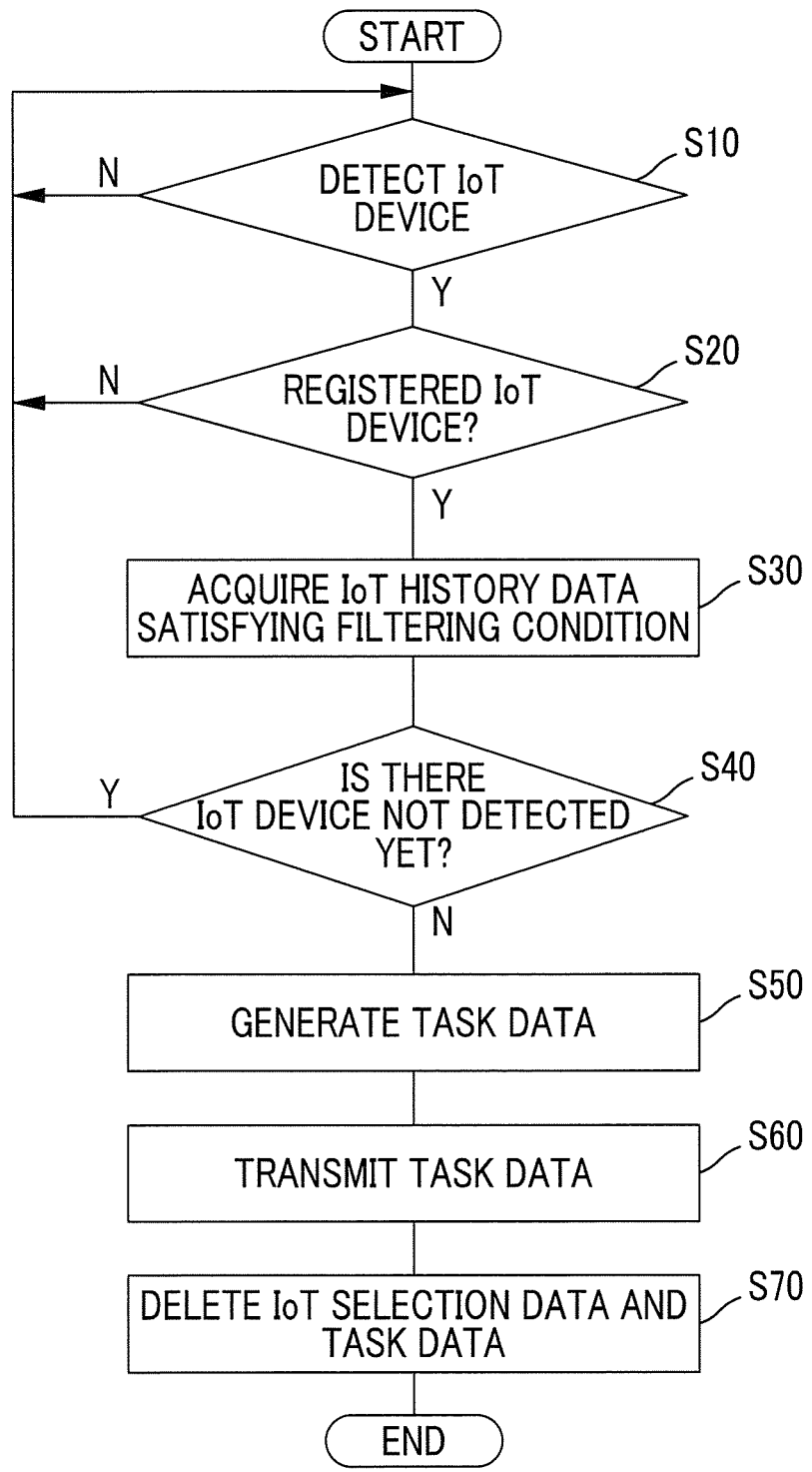
FIG. 4 is a flowchart illustrating one example of a flow of information processing in the information processing apparatus.

FIG. 4 is a flowchart illustrating one example of a flow of information processing executed by the CPU 41 in a case where the task data generating function is executed.

An information processing program that regulates information processing is stored in advance in, for example, the ROM 42 of the information processing apparatus 10. The CPU 41 of the information processing apparatus 10 reads the information processing program stored in the ROM 42 and executes information processing.

While the analysis target of the task using the information processing apparatus 10 is not limited, the operation of the information processing system 100 will be described in an example in which the facsimile function is executed in order to analyze the degree to which the user performs delivery confirmation for confirming whether or not the original document is delivered to a transmission destination of the original document after transmitting the original document by executing the facsimile function of the information processing apparatus 10.

Therefore, the DM data 22 that is generated by executing the facsimile function is assumed to be stored in advance in the non-volatile memory 44 of the information processing apparatus 10.

FIG. 5 is a diagram illustrating one example of the DM data 22 stored in the non-volatile memory 44. As illustrated in FIG. 5, the DM data 22 that indicates that facsimile transmission is performed for a transmission destination indicated by a facsimile number of [XX-YYYY-ZZZZ] at 11:34:06 on Mar. 3, 2018 is recorded in the non-volatile memory 44. In a case where the user performs facsimile transmission by inputting user information indicating an identity of the user into the information processing apparatus 10, the user information is recorded in the DM data 22.

In order to perform the above analysis, the IoT history data 24 that indicates that delivery confirmation of the original document is performed may be acquired from the IoT device 20 that includes confirmation means which confirms that the original document is delivered to the transmission destination of the original document. The delivery confirmation is often immediately performed after the original document is transmitted. Therefore, for example, the IoT history data 24 within a specified period (for example, 30 minutes) starting from a time when the original document is transmitted in the information processing apparatus 10 may be acquired from the IoT device 20.

In addition, the delivery confirmation tends to require reliability and responsiveness. Thus, confirmation that is based on a telephone with which a direct conversation is made with a party at the transmission destination of the original document is often used, compared to mail for which the time of confirmation by the party is not known.

Therefore, for example, the user registers a condition that the IoT history data 24 is included in a specified period starting from the time of facsimile transmission (in the example in FIG. 5, 11:34:06 on Mar. 3, 2018) and indicates a record of a telephone call, as the filtering condition 16 in the information processing apparatus 10. The length of the specified period may be freely set by the user. While the IoT history data 24 acquired from the IoT device 20 is restrictively described as a record of a telephone call for illustrative purposes, the filtering condition 16 may be set such that a record of mail communication is also acquired.

The filtering condition 16 is created using a regular conditional expression that is interpreted in the CPU 41 of the information processing apparatus 10. The filtering condition 16 is registered in the information processing apparatus 10 by the user inputting the created conditional expression from the input unit 52A.

The user may input a keyword correlated with a content to be analyzed, such as a "facsimile and "delivery confirmation", into the input unit 52A. In this case, the information processing apparatus 10 understands the content of the task to be analyzed for the user using a well-known inference method from the keyword input by the user into the input unit 52A, and generates the filtering condition 16 for acquiring the IoT history data 24 needed for analysis from the IoT device 20.

In addition, the IoT device 20 that is a target for collecting the IoT history data 24 is correlated in advance with the information processing apparatus 10 such that the IoT history data 24 is not acquired from the IoT device 20 owned by the user. Accordingly, acquiring of personal information of the user that is not needed for analysis is restricted, compared to a case where the IoT history data 24 is acquired from each detected IoT device 20. For example, a smartphone for task provided by a company is assumed to be correlated with the information processing apparatus 10 for illustrative purposes as the IoT device 20 of a target for collecting the IoT history data 24. Correlating of the IoT device 20 with the information processing apparatus 10 is implemented by storing, in the non-volatile memory 44, an identifier with which the information processing apparatus 10 uniquely identifies the IoT device 20, for example, a MAC address.

First, in step S10, the CPU 41 determines whether or not the IoT device 20 is detected. While whether or not the IoT device 20 is detected is determined by, for example, whether or not a response is made from the IoT device 20 in response to a connection request transmitted by the information processing apparatus 10, a method of detecting the IoT device 20 in the CPU 41 is not limited thereto. For example, the CPU 41 may detect the IoT device 20 by detecting a message that is transmitted by the IoT device 20.

In a case where the IoT device 20 is not detected, the determination process in step S10 is repeated, and the detection of the IoT device 20 continues. In a case where the IoT device 20 is detected, a transition is made to step S20.

In step S20, the CPU 41 determines whether or not the IoT device 20 detected in step S10 is the IoT device 20 that is correlated in advance with the information processing apparatus 10, that is, the IoT device 20 that is registered in the information processing apparatus 10. Whether or not the detected IoT device 20 is the IoT device 20 registered in the information processing apparatus 10 is determined by comparing, for example, the MAC address of the detected IoT device 20 with a MAC address that is stored in the non-volatile memory 44.

In a case where the detected IoT device 20 is not the IoT device 20 registered in the information processing apparatus 10, the IoT history data 24 that is needed for intended analysis is not acquired even in a case where the IoT history data 24 is acquired from the IoT device 20. Thus, a transition is made to step S10, and another IoT device 20 is detected. In a case where the detected IoT device 20 is the IoT device 20 registered in the information processing apparatus 10, a transition is made to step S30.

In step S30, the CPU 41 receives the IoT history data 24 from the registered IoT device 20 and acquires the IoT history data 24 that satisfies the preset filtering condition 16 among the received IoT history data 24, that is, the IoT selection data 28. The CPU 41 stores the acquired IoT selection data 28 in, for example, the non-volatile memory 44.

FIG. 6 is a diagram illustrating one example of the IoT history data 24 in the registered IoT device 20. As illustrated in FIG. 6, the IoT device 20 stores the IoT history data 24 that includes a record of WEB browsing, a record of a telephone call, and a record of mail transmission. The record of the telephone call is a record at 11:35:51 Mar. 3, 2018 and is the IoT history data 24 that is recorded within the specified period (for example, 30 minutes) from the time of facsimile transmission in the information processing apparatus 10 as illustrated in FIG. 5.

Therefore, the CPU 41 stores the record of the telephone call in FIG. 6 in, for example, the non-volatile memory 44 as the IoT history data 24 that satisfies the filtering condition 16. Accordingly, the IoT selection data 28 is acquired.

The IoT history data 24 that indicates the record of the telephone call illustrated in FIG. 6 is one example. The record of the telephone in a case where a call is made from the IoT device 20 may include, for example, a telephone number to which the call is made, a calling time, and positional information of the IoT device 20 at the time of making the call to the party. In addition, the record of the telephone call in a case where a call is received in the IoT device 20 may include a telephone number from which the call is received, a reception time, the positional information of the IoT device 20 at the time of receiving the call from the party, and the like.

Even in a case where the detected IoT device 20 is the registered IoT device 20, the IoT history data 24 is not stored in the non-volatile memory 44 in a case where there is no IoT history data 24 satisfying the filtering condition 16.

In step S40, the CPU 41 determines whether or not the IoT device 20 that is not detected yet in step S10 is present among the registered IoT devices 20. In a case where the IoT device 20 that is not detected yet is present among the registered IoT devices 20, the IoT history data 24 that satisfies the filtering condition 16 may be recorded in the IoT device 20. Thus, a transition is made to step S10, and another IoT device 20 is detected.

While the IoT history data 24 that satisfies the filtering condition 16 is selected from the IoT history data 24 received by the information processing apparatus 10 from the IoT device 20 for illustrative purposes, for example, the information processing apparatus 10 may transmit the filtering condition 16 to each registered IoT device 20, and the IoT device 20 may transmit the IoT history data 24 satisfying the filtering condition 16 to the information processing apparatus 10.

Figure 7:
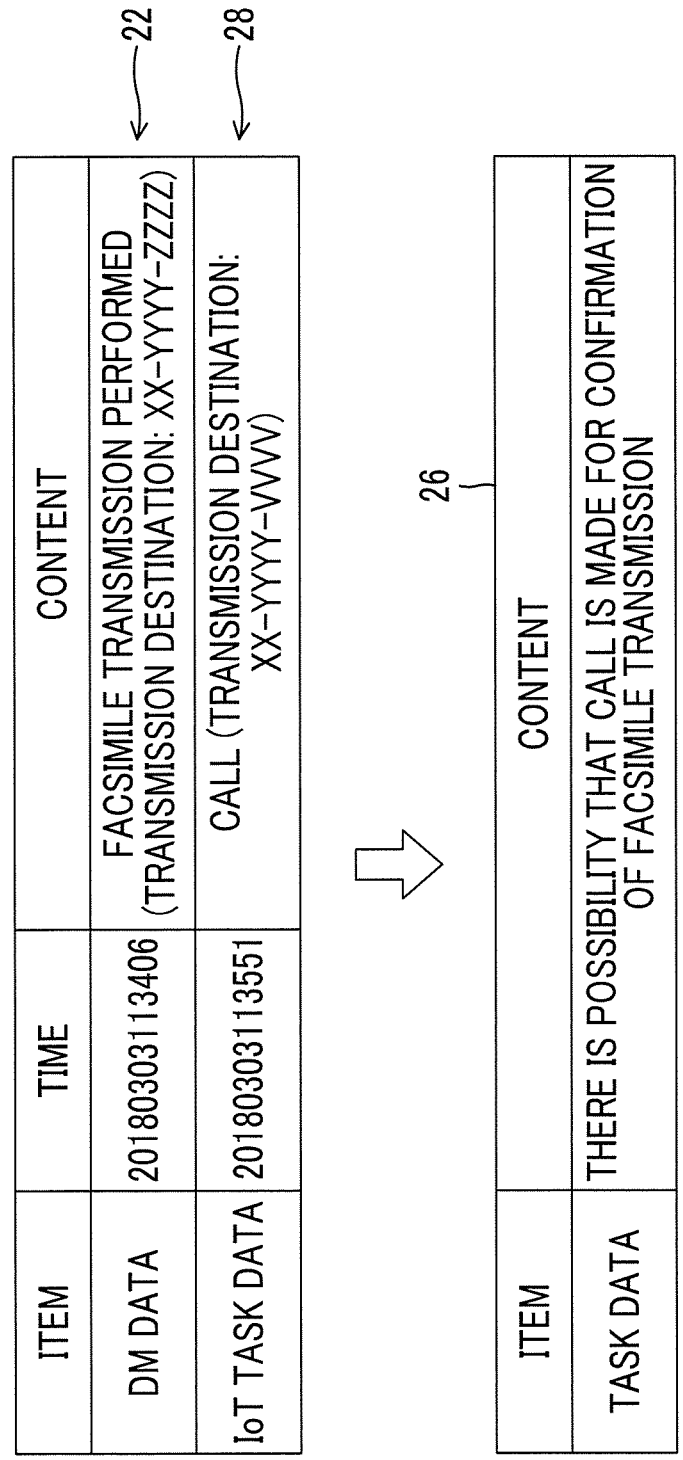
FIG. 7 is a diagram illustrating one example of task data.

FIG. 7 is a diagram illustrating an example of the DM data 22 of facsimile transmission recorded in the non-volatile memory 44 and the IoT selection data 28 that is acquired using the filtering condition 16 and includes a record of content that the user is estimated to execute in the IoT device 20 by performing facsimile transmission indicated in the DM data 22.

In a case where the DM data 22 of facsimile transmission is combined with the IoT selection data 28, it is found that a telephone call is made one minute and 45 seconds after facsimile transmission is performed. Thus, in step S50, the CPU 41 generates the task data 26 that indicates a possibility that delivery confirmation of the original document is performed in the task flow of facsimile transmission such that "there is a possibility of making a call for confirmation of facsimile transmission".

FIG. 8 is a diagram illustrating a situation in which the IoT selection data 28 is not acquired with respect to the DM data 22 of facsimile transmission recorded in the non-volatile memory 44.

In this case, since there is no sign of a telephone call after facsimile transmission is performed, the CPU 41 generates the task data 26 that indicates a possibility that delivery confirmation of the original document is not performed in the task flow of facsimile transmission such that "there is a possibility of not making a call for confirmation of facsimile transmission".

In step S60, the CPU 41 transmits the task data 26 generated in step S50 to the analysis server 30.

In the analysis server 30 that receives the task data 26, a tendency related to the behavior of the user in a case where the user performs facsimile transmission in the information processing apparatus 10 is analyzed using the task data 26 and, if necessary, information that is collected from another apparatus different from the information processing apparatus 10, and the result of analysis is output. A task-related object may be found by studying the result of analysis output by the analysis server 30. For example, from the result of analysis according to the present exemplary embodiment, an object of the task that is performed by executing the main functions of the information processing apparatus 10 is found such that "delivery confirmation is not performed for A % of original documents that are transmitted by facsimile".

By transmitting the task data 26 to the analysis server 30, the task data 26 and the IoT selection data 28 used in the generation of the task data 26 are not needed anymore. Therefore, in step S70, the CPU 41 deletes the IoT selection data 28 acquired in step S30 and the task data 26 generated in step S50 from the non-volatile memory 44.

However, depending on the specifications of the analysis server 30, it is considered that a retransmission request may be received from the analysis server 30 such that the task data 26 that is transmitted once is transmitted again. Therefore, the CPU 41 may delete at least one of the IoT selection data 28 or the task data 26 from the non-volatile memory 44 after a preset holding period elapses from the transmission of the task data 26 to the analysis server 30 in step S60.

In the case of deleting any one of the IoT selection data 28 or the task data 26 from the non-volatile memory 44, deleting of the IoT selection data 28 decreases the proportion of data correlated with the task data generating function occupying the storage capacity of the non-volatile memory 44 further than deleting of the task data 26 since the IoT selection data 28 may be acquired from multiple IoT devices 20. The holding period for the IoT selection data 28 and the task data 26 is one example of a predetermined period in the present exemplary embodiment.

Then, the information processing illustrated in FIG. 4 is finished.

In the information processing illustrated in FIG. 4, a condition that the IoT history data 24 is included in the specified period starting from the time of facsimile transmission and indicates a record of a telephone call is set as the filtering condition 16. However, in a case where the record of the telephone call of the IoT history data 24 in the IoT device 20 includes the caller telephone number and the positional information of the IoT device 20, the caller telephone number and the positional information of the IoT device 20 may be added to the filtering condition 16.

For example, a facsimile number of the party to which the original document is transmitted by facsimile, and a telephone number of the party may have the same area code and the same local number but have different subscriber numbers only. Therefore, as illustrated in FIG. 5, in a case where the transmission destination facsimile number to which the original document is transmitted is recorded in the DM data 22 of facsimile transmission, the IoT history data 24 acquired in the information processing apparatus 10 is further selected in a case where a setting condition that the "IoT history data 24 related to a call made to a telephone number of which the area code and the local number are the same as the area code and the local number of the facsimile number is acquired" is further added to the setting condition of the filtering condition 16. That is, the proportion of data correlated with the task data generating function occupying the storage capacity of the non-volatile memory 44 is decreased, compared to the case of not adding a setting condition related to a telephone number to the filtering condition 16.

In addition, since the user tends to immediately perform confirmation in the case of performing delivery confirmation of facsimile transmission after transmitting the original document by facsimile, the user often performs delivery confirmation at a location close to the information processing apparatus 10, for example, within a range of a few tens of meters from the information processing apparatus 10 that transmits the original document. Therefore, in a case where positional information of the information processing apparatus 10 is known, the IoT history data 24 acquired in the information processing apparatus 10 is further selected in a case where a setting condition that the "IoT history data 24 for which positional information in the case of making a telephone call is included within H m (H is a positive number) from the information processing apparatus 10 is acquired" is further added to the setting condition of the filtering condition 16. That is, the proportion of data correlated with the task data generating function occupying the storage capacity of the non-volatile memory 44 is decreased, compared to the case of not adding a setting condition related to the positional information of the IoT device 20 to the filtering condition 16.

In addition, it is considered that the user performs delivery confirmation of facsimile transmission through a delivery confirmation application installed in the IoT device 20 without making a call, if necessary. Therefore, in a case where the application name of the delivery confirmation application is added to the setting condition of the filtering condition 16, the IoT history data 24 that includes the application name and a record of launch of the delivery confirmation application is acquired as the IoT selection data 28 in the information processing apparatus 10.

Besides, in a case where the IoT device 20 for which delivery confirmation of facsimile transmission is to be performed is predetermined, an identifier, such as a management number and a MAC address, that is uniquely assigned to the IoT device 20 may be added to the setting condition of the filtering condition 16. For example, in a case where the IoT history data 24 in which the use of the IoT device 20 that is used for delivery confirmation of facsimile transmission is recorded within the specified period from the time of facsimile transmission is acquired, the task data 26 that indicates a possibility that delivery confirmation of the original document is performed in the task flow of facsimile transmission is generated in the information processing apparatus 10.

In the present exemplary embodiment, while the information processing executed in the information processing apparatus 10 is described using an example in which the status of delivery confirmation of facsimile transmission is analyzed, the analysis target of the task is not limited thereto.

For example, in a case where the original document is received in the facsimile unit 55 of the information processing apparatus 10, the party that transmits the original document may be notified of the reception of the original document. Therefore, by setting the filtering condition 16 such that the IoT history data 24 including the record of the telephone call is acquired from the IoT device 20, and combining the acquired IoT history data 24 with the DM data 22 that includes a record of reception of the original document by facsimile, the task data 26 that indicates the execution status of reception confirmation in the case of receiving the original document by facsimile is generated.

In addition, in order to verify whether or not there is a large number of misprints during the task, the information processing apparatus 10 may generate the task data 26 by combining the DM data 22 correlated with image formation with the IoT history data 24 of a shredder.

Specifically, in a case where there is an error in the content of a recording medium on which an image is formed in the information processing apparatus 10, the user may discard the recording medium such as paper discharged from the information processing apparatus 10 using the shredder. Therefore, the status of misprints is analyzed by combining the IoT history data 24 of the shredder with the DM data 22 correlated with image formation of the information processing apparatus 10.

In a case where the user discards the recording medium of which the content has an error, the user tends to immediately discard the recording medium after the image is formed on the recording medium. Thus, for example, by setting the filtering condition 16 such that a time in which the shredder is used, and positional information of the used shredder are acquired, the IoT history data 24 that is appropriate for analysis is acquired from the shredder and is used in the generation of the task data 26.

In addition, in order to verify whether or not computerization of a document is delayed during the task, the information processing apparatus 10 may generate the task data 26 by combining the DM data 22 correlated with image formation with the IoT history data 24 of the IoT device 20 such as a smartphone that is carried by the user.

In a case where computerization of a document is not performed, the document that is created using the image forming function of the information processing apparatus 10 is carried to a submission location. Therefore, the status of computerization of a document in the task is analyzed by combining the IoT history data 24 of the smartphone indicating positional information of the user with the DM data 22 correlated with image formation of the information processing apparatus 10.

Specifically, by setting the filtering condition 16 such that the positional information of the smartphone in the specified period after a document is created in the information processing apparatus 10 is acquired, the IoT history data 24 that is appropriate for analysis is acquired from the smartphone and is used in the generation of the task data 26.

In a case where the task data 26 that indicates that the user tends to go to a general affairs department after creating a document in the information processing apparatus 10 is generated, an analysis such that computerization of a document to be submitted to the general affairs department is delayed is made in the analysis server 30.

While the invention is described thus far using the exemplary embodiment, the invention is not limited to the scope disclosed in the exemplary embodiment. Various modifications or improvements can be made to the exemplary embodiment to the extent not departing from the nature of the invention, and exemplary embodiments to which such modifications or improvements are made also fall within the technical scope of the invention. For example, the order of processes may be changed to the extent not departing from the nature of the invention.

In addition, in the present exemplary embodiment, while information processing is implemented by software for illustrative purposes, a process that is equivalent to the flowchart illustrated in FIG. 4 may be implemented in, for example, an application specific integrated circuit (ASIC) and processed by hardware. In this case, the speed of the process is increased, compared to the case of implementing information processing by software.

In addition, in the above exemplary embodiment, while the information processing program is installed in the ROM 42, the invention is not limited thereto. The information processing program according to the exemplary embodiment of the invention may be provided as a record on a computer readable storage medium. For example, the information processing program according to the exemplary embodiment of the invention may be provided as a record on an optical disc such as a compact disc (CD)-ROM or a Digital Versatile Disc (DVD)-ROM. In addition, the information processing program according to the exemplary embodiment of the invention may be provided as a record in a semiconductor memory such as a USB memory and a flash memory. Furthermore, the information processing apparatus 10 may acquire the information processing program according to the exemplary embodiment of the invention from an external apparatus, not illustrated, that is connected to the communication line 2 or the communication line 4.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
   acquire first information from an electronic device based on first history information of the electronic device satisfying a filtering condition;
   store the first information acquired in a storage device;
   perform a control of transmitting second information to an external apparatus, the second information being acquired by combining the first information stored in the storage device with second history information which is generated by an execution of a function which comprises an image forming function, a facsimile function, a scanning function, a copying function, and a printing function, in a case where the first information and the second history information are associated with the same one function which has been performed;
   perform a control of transmitting second information to an external apparatus, the second information being acquired according to the second history information without the first information in a case the where the storage device does not include the first information which is associated with the second history information by the same one function; and
   delete the first information received from the electronic device from the storage device and the second information after the second information is transmitted to the external apparatus, wherein the second information is an event which occurs in response to the execution of the function and is related to the execution of the function.

2. The information processing apparatus according to claim 1, wherein the processor controls such that the first information is deleted from the storage device after an elapse of a predetermined period after the second information is transmitted to the external apparatus.

3. The information processing apparatus according to claim 1, wherein the filtering condition is set as a condition that the first information that is correlated with a content of a task by executing the function focused as an analysis target of the task using the information processing apparatus is acquired from the first history information.

4. The information processing apparatus according to claim 1, wherein the filtering condition is set as a condition that the first information that is correlated with a content of a task by executing the function focused as an analysis target of the task using the information processing apparatus is acquired from the first history information.

5. The information processing apparatus according to claim 2, wherein the filtering condition is set as a condition that the first information that is correlated with a content of a task by executing the function focused as an analysis target of the task using the information processing apparatus is acquired from the first history information.

6. The information processing apparatus according to claim 3,
   wherein the function is a function of the information processing apparatus, and
   the first information is history information related to a behavior that is executed in the electronic device by executing the function of the information processing apparatus.

7. The information processing apparatus according to claim 6,
   wherein the function is a function of the information processing apparatus, and
   the first information is history information related to a behavior that is executed in the electronic device by executing the function of the information processing apparatus.

8. The information processing apparatus according to claim 5,
   wherein the function is a function of the information processing apparatus, and
   the first information is history information related to a behavior that is executed in the electronic device by executing the function of the information processing apparatus.

9. The information processing apparatus according to claim 6,
   wherein the processor acquires the history information related to the behavior from the electronic device that is correlated in advance with the information processing apparatus.

10. The information processing apparatus according to claim 7,
    wherein the processor acquires the history information related to the behavior from the electronic device that is correlated in advance with the information processing apparatus.

11. The information processing apparatus according to claim 8,
    wherein the processor the history information related to the behavior from the electronic device that is correlated in advance with the information processing apparatus.

12. The information processing apparatus according to claim 6,
    wherein the first history information includes positional information in a case where the behavior is performed in the electronic device, and the processor acquires the history information related to the behavior from the electronic device for which the positional information is included within a predetermined range from the information processing apparatus.

13. The information processing apparatus according to claim 7,
wherein the first history information includes positional information in a case where the behavior is performed in the electronic device, and
the processor acquires the history information related to the behavior from the electronic device for which the positional information is included within a predetermined range from the information processing apparatus.

14. The information processing apparatus according to claim 8,
wherein the first history information includes positional information in a case where the behavior is performed in the electronic device, and
the processor acquires the history information related to the behavior from the electronic device for which the positional information is included within a predetermined range from the information processing apparatus.

15. The information processing apparatus according to claim 9,
wherein the first history information includes positional information in a case where the behavior is performed in the electronic device, and
the processor acquires the history information related to the behavior from the electronic device for which the positional information is included within a predetermined range from the information processing apparatus.

16. The information processing apparatus according to claim 10,
wherein the first history information includes positional information in a case where the behavior is performed in the electronic device, and
the processor acquires the history information related to the behavior from the electronic device for which the positional information is included within a predetermined range from the information processing apparatus.

17. The information processing apparatus according to claim 6,
wherein the second information is information that indicates a status of confirmation related to completion of communication by the electronic device, the confirmation being performed after the function of the information processing apparatus is executed.

18. The information processing apparatus according to claim 6,
wherein the first information includes at least one of information related to a communication destination, a communication time, or positional information of the electronic device.

19. A non-transitory computer readable medium storing an information processing program causing a computer to function as the processor of the information processing apparatus according to claim 1.

* * * * *